United States Patent [19]
Bostelmann

[11] Patent Number: 5,326,330
[45] Date of Patent: Jul. 5, 1994

[54] VARIABLE RATIO DRIVE PULLEY

[75] Inventor: Willy Bostelmann, Wels, Austria

[73] Assignee: Bombardier Inc., Montreal, Canada

[21] Appl. No.: 60,158

[22] Filed: May 11, 1993

[30] Foreign Application Priority Data

May 12, 1992 [IT] Italy ................ 14A 967/92

[51] Int. Cl.⁵ ........................... F16H 55/52
[52] U.S. Cl. ........................... 474/13; 474/14
[58] Field of Search ........................... 474/11-16

[56] References Cited

U.S. PATENT DOCUMENTS

| | | |
|---|---|---|
| 2,986,043 | 5/1961 | Jaulmes . |
| 3,230,787 | 1/1966 | Siegel . |
| 3,597,987 | 8/1971 | Kiekhoefer . |
| 3,605,510 | 9/1971 | Laughlin . |
| 3,605,511 | 9/1971 | Deschene . |
| 3,648,532 | 3/1972 | Vallieres . |
| 3,665,781 | 5/1972 | Kawamura . |
| 3,675,500 | 7/1972 | Albertson . |
| 3,727,478 | 4/1973 | Erickson et al. . |
| 3,733,918 | 5/1973 | Domaas ................ 474/14 |
| 3,759,111 | 9/1973 | Hoff . |
| 3,777,583 | 12/1973 | Talbot . |
| 3,939,720 | 2/1976 | Aaen et al. ................ 474/14 |
| 3,971,263 | 7/1976 | Beaudoin et al. . |
| 4,027,544 | 6/1977 | Kobayashi ................ 474/14 |
| 4,052,908 | 10/1977 | Takagi et al. . |
| 4,095,479 | 6/1978 | Lundberg . |
| 4,313,728 | 2/1982 | Prasad . |
| 4,575,363 | 3/1986 | Burgess et al. . |

*Primary Examiner*—Thuy M. Bui
*Attorney, Agent, or Firm*—Dorsey & Whitney

[57] ABSTRACT

In order to provide for advantageous adjustment possibilities for an infinitely variable drive pulley for a belt drive transmission with two flanges arranged on a shaft and which accommodate a V-belt. One flange is fixed axially on the shaft and the other is moveable in the axial direction against the force of at least one return spring by centrifugal weights in the form of adjusting levers. The adjusting levers each acts on an abutment cam surface, and is supported so as to be able to pivot out about a pin that extends transversely to the shaft, spaced radially therefrom. The adjusting levers can be moved relative to their pivot pins through an adjustment eccentric.

3 Claims, 4 Drawing Sheets

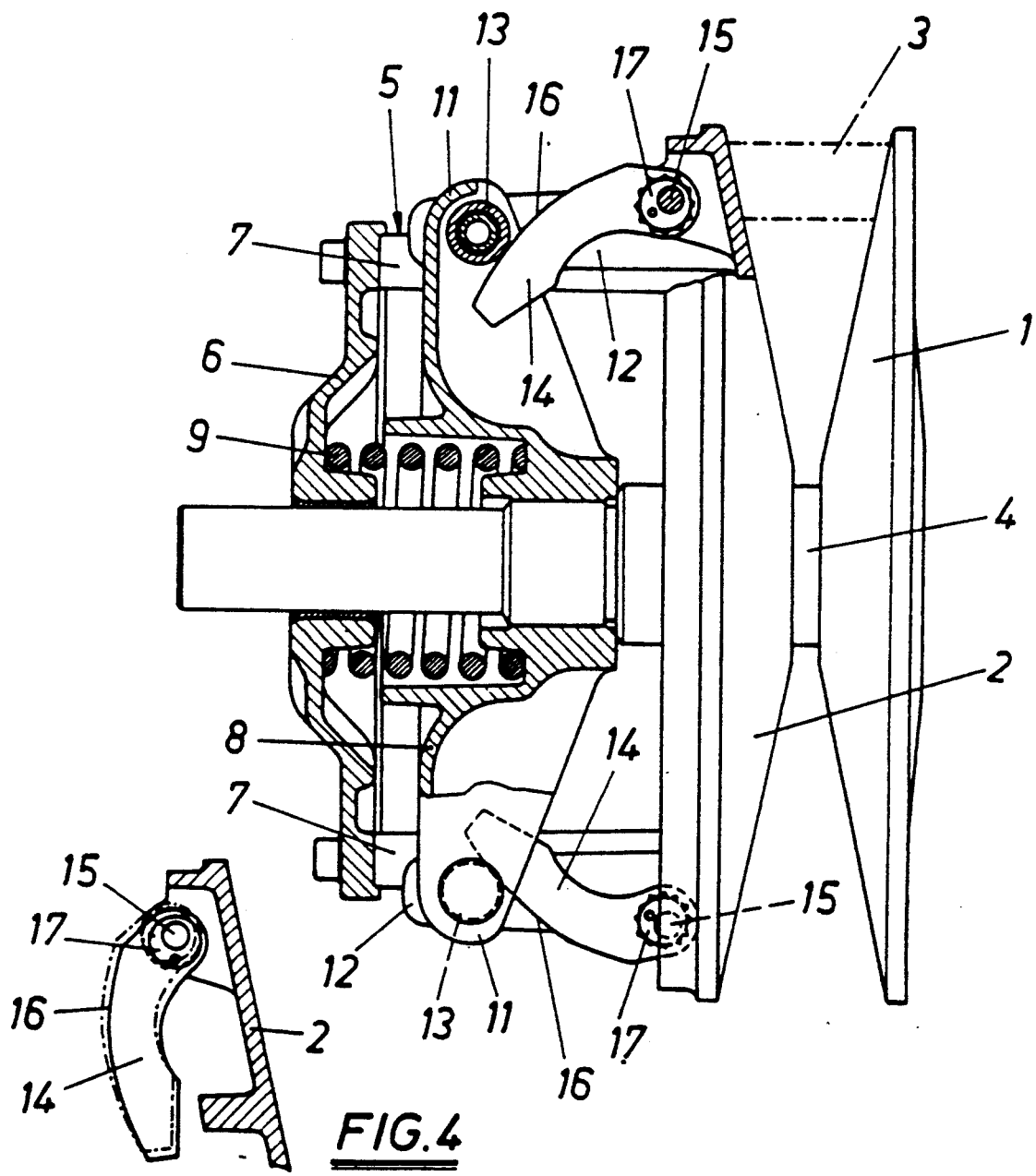

VARIABLE RATIO DRIVE PULLEY

BACKGROUND OF THE INVENTION a) Field of the Invention

The present invention relates to an infinitely variable drive pulley for a belt drive transmission.

b) Description of the Prior Art

Pulleys of this type are known, and comprise opposed frusto-conical flanges which co-operate with a drive belt. Cone pulley is secured axially on the shaft and the other can be moved axially against the force of a return spring, by centrifugal weights in the form of adjusting levers that act on an adjusting stop through a cam surface and which are each supported so as to be able to pivot outwards about a pin that extends transversely to the shaft and is spaced radially therefrom.

To establish the size of the V-gap between the two pulley flanges of such drive transmissions as a function of the particular rotational speed, it is known (from US-PS 3 759 111) that levers acting as centrifugal weights can be associated with the axially adjustable pulley flange, these levers being supported on rollers associated with the fixed flange, so that when the adjusting levers pivot outwards as a result of centrifugal force the axially moveable flange is pressed towards the fixed flange. The axial adjustment path of the pulley thus depends on the angle to which the adjusting levers are pivoted, which in turn is determined by centrifugal forces and by the shape of the rolling track for the rollers on the adjusting levers. Thus, for a given course of the return force, a desired inter relationship of the axial movement of the movable flange and the rotational speed can be achieved by the shape of the rolling track of the adjusting lever (which forms a cam surface) and by the mass of the centrifugal weight formed by the adjusting lever, and the position of the centre of gravity of such mass. However, a given relationship between the axial movement of the moveable flange and the rotational speed can only be maintained if the position of the cam surface of the adjusting lever and the mass of the centrifugal weights and the position of the centre of gravity of such weights can be kept within close tolerances; it is extremely difficult to guarantee this in components made by production, and requires subsequent adjustment work.

It is known that to adjust the weighted levers, the position of each lever or of the roller that is associated with it as an adjustable abutment can be moved. However, such a step provides a corresponding matching potential and adjustment only in the range of small adjustment paths but not, however, in the range of larger adjustment paths, for which a match would be of considerably greater importance.

SUMMARY OF THE INVENTION

Thus, it is the task of the present invention so to improve a drive pulley of the type described in the introduction hereto using simple structural means, such that the relationship of the axial adjustment movement of the moveable pulley flange and the rotational speed, in particular in the range of larger adjustment movements, can be matched advantageously to a desired pattern.

The present invention provides an infinitely variable drive pulley for a belt drive transmission, said pulley comprising a shaft that carries opposed first and second frusto-conical flanges adapted to accommodate between them a drive belt, said first flange being axially fixed on the shaft, said second flange being arranged on the shaft so as to be moveable in the axial direction thereon against the force of at least one return spring, said pulley including centrifugal weights in the form of adjusting levers, each said lever being pivotally mounted on a pin that is carried at a fixed position relative to one of said flanges, each said lever defining a cam surface that is adapted to engage a follower that is fixedly related to the other said flange, each said lever being so disposed that upon rotation of said pulley a centrifugal force is generated to press said surface into engagement with said follower with a pressure that increases with the speed of rotation (such engagement applying a force that urges second flange to move axially towards said first flange against the force of said return spring) wherein an adjustable eccentric member is interspersed between each said lever and its associated pin said eccentric member being angularly adjustable to effect variations in the position of said lever relative to said pin in a plane normal to the length of said pin.

By such an eccentric member both the position of the centre of gravity of the lever and the initial position of its cam surface in relation to the follower, are changed because of the eccentric displacement of the adjusting lever relative to its axis of rotation, i.e. the axis of the pivot pin. This therefore presents the possibility of adjustment within wide limits, above all in the range of relatively large displacements of the moveable pulley flange, which is desired. The adjustment path of the moveable pulley flange can be set very simply as a function of the rotational speed by way of a rotational adjustment of the adjusting eccentric of the adjusting levers.

In order to be able to provide adjustment of rotational position of the adjustment eccentric without excessive cost, in a further development of the present invention the adjusting eccentric can be in the shape of a regular polygon and fitted in a corresponding polygonal recess in the adjusting lever. The polygonal form ensures that the adjusting eccentrics are held in the adjusting arms in such a way that they cannot rotate. To effect adjustment the adjusting eccentric is simply withdrawn from the recess in the adjusting arm and, after being rotated by a multiple of the angular division that is provided by the polygon, is simply reinserted into the recess in the adjusting arm. Such a configuration permits only an incremental adjustment of the adjusting eccentric; nevertheless, the graduations can be effected in sufficiently small increments.

BRIEF DESCRIPTION OF THE DRAWINGS

A preferred embodiment of the present invention is shown by way of example only, in the drawings that are appended hereto, wherein:

FIG. 3 is a partially sectioned side view of the drive pulley in an operating position that is set to a specific speed of rotation;

FIG. 4 shows an adjusting lever that serves as a centrifugal weight, shown in side view in two adjustment positions.

Figure 1:
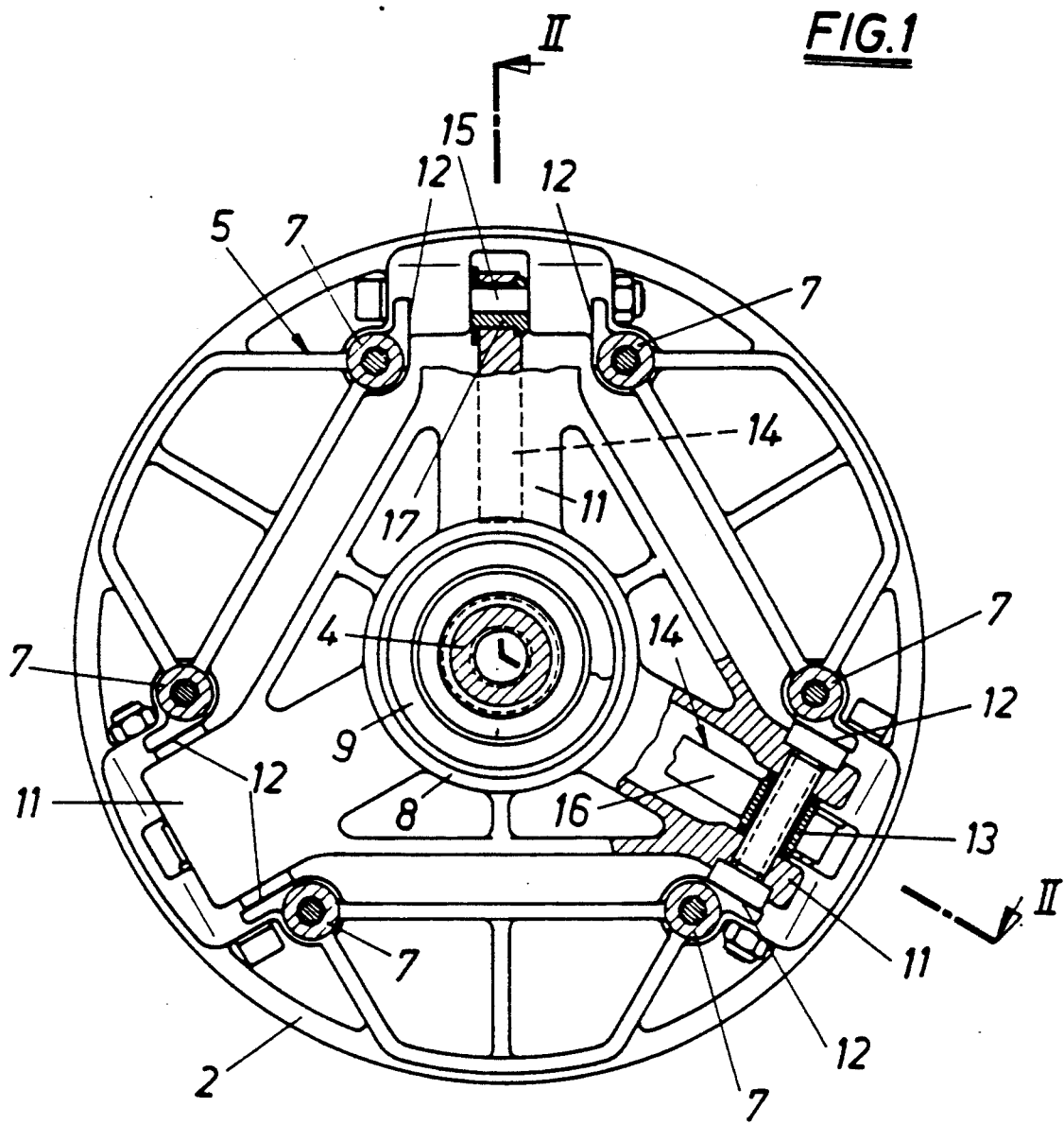
FIG. 1 is a cross sectional view of a drive pulley for a belt drive transmission according to the present invention, taken on the line I—I in FIG. 2.
Figure 2:
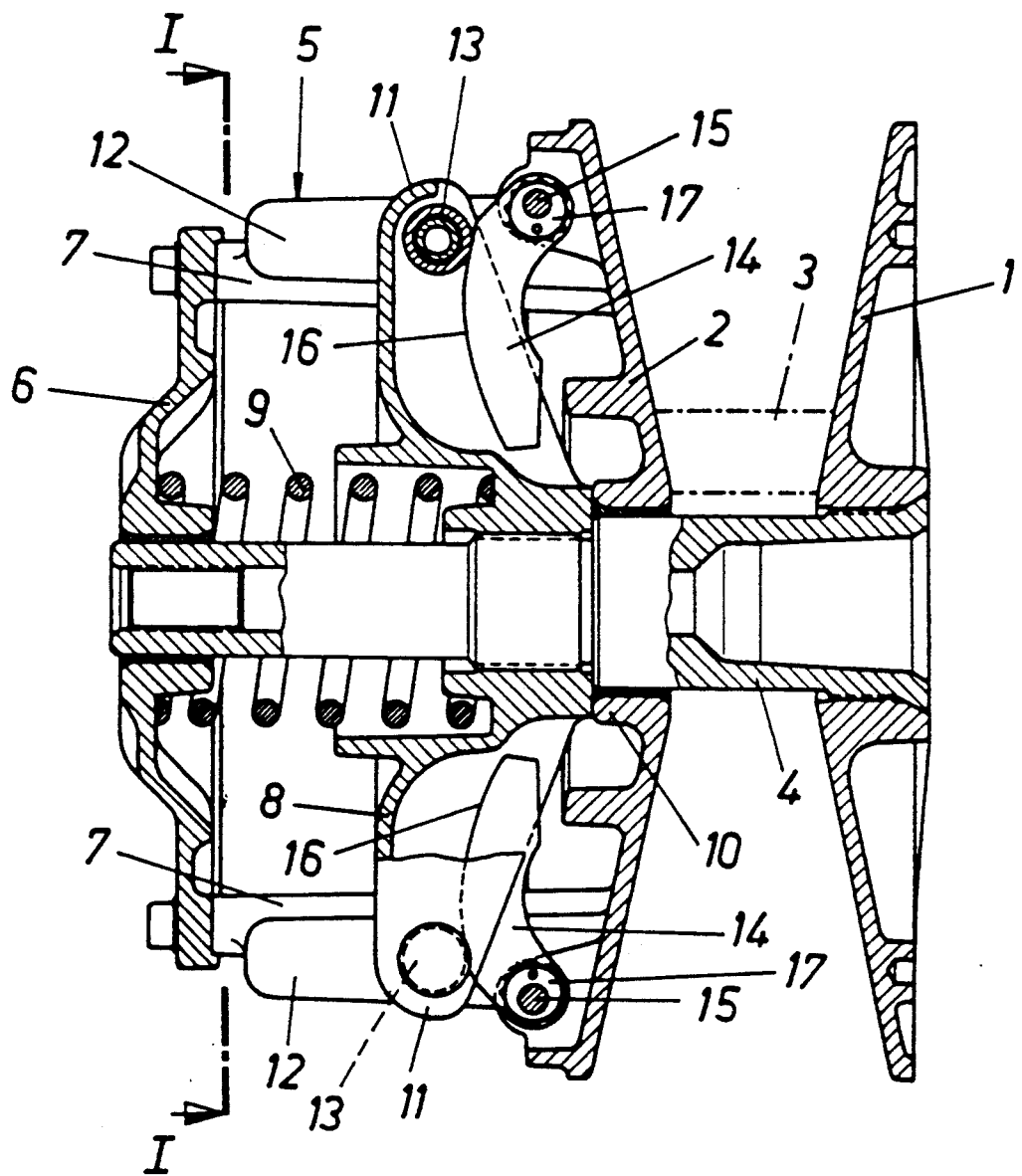
FIG. 2 is a view of the drive pulley in an axial cross section taken on the line II—II in FIG. 1.

The drive pulley for a belt drive transmission shown has two opposed frusto-conical flanges 1 and 2 that form the V-gap that is used to accommodate a V-belt 3 indicated in broken lines in FIGS. 2 and 3. The flange 1 is mounted on a shaft 4 so as to be immoveable in the axial direction and unable to rotate independently of the shaft. The other flange 2 is supported so as to be able to move axially relative to the shaft 4. The arrangement is such that the flange 2 can be moved relative to the shaft 4 is part of a housing 5 through which the shaft 4 passes in such a way that it can move axially. The housing 5 consists of a cover 6 that is opposite the moveable flange 2 and spacers 7 that are arranged between the flange 2 and the cover 6. A three-armed operating head 8 that is fixedly secured to the shaft 4 and is pressed against a stop support or choulder 10 that is on the flange 2 with the help of a coiled compression return spring 9 that is supported against the housing cover 6. Each arm 11 of the operating head 8 engages between two spacers 7 that are provided with the sliding surfaces 12 to guide the arms 11, so that the housing 5 with the flange 2 is rotated with the shaft 4 through the operating head 8.

At the ends of the arms 11, the operating head 8 supports rollers 13 that serve as abutments for the adjusting levers 14 which have pins that extend transversely to the shaft 4, are separated radially therefrom, and are supported on the moveable flange 2.

The adjusting levers 14 act as centrifugal weights and pivot progressively from a starting position shown in FIG. 2 into an operating position such as is shown, for example, in FIG. 3, while acting on the operating head 8 on axially against the force of the return spring 9. When this takes place, the rollers 13 roll on the edges of the adjusting levers 14, which each form a cam surface 16. The axial adjusting path of the operating head 8 and of the flange 2 relative to the shaft 4 thus depends on the shape of the cam surface 16 at a given angle of pivot of the adjusting lever 14, and, as a consequence, can be determined by this cam surface 16 as a function of the rotational speed.

In order that unavoidable production tolerances can be compensated for, and in order that such a drive pulley for a belt drive transmission can be appropriately adjusted, the adjusting levers 14 are each supported on their pins 15 through an adjusting eccentric 17, the shape of which corresponds to a regular polygon, and engages in a corresponding recess in the adjusting lever 14. As can be seen, in particular, from FIGS. 4 and 5, the starting position of the adjusting level 14 can be changed relative to its pin 15 by an eccentric adjustment (that is indicated by the broken line), as is shown by the position of the adjusting lever 14 shown in the solid lines. Such displacement of the adjusting lever 14 relative to the pin 15 not only changes the position of the centre of gravity of the adjusting lever but also the position of the cam surface 16, so that when the adjusting levers 14 that are supported by way of the adjusting eccentric 17 pivot outwards, the conditions for the axial displacement of the operating head 8 within the housing 5 are changed, which means that appropriately modified dynamic response characteristics can be associated with varying speeds of rotation, these being possible in particular in the range of larger displacements of the moveable flange 2 for the starting position of FIG. 2 or greater rotational speeds.

Figure 5A:
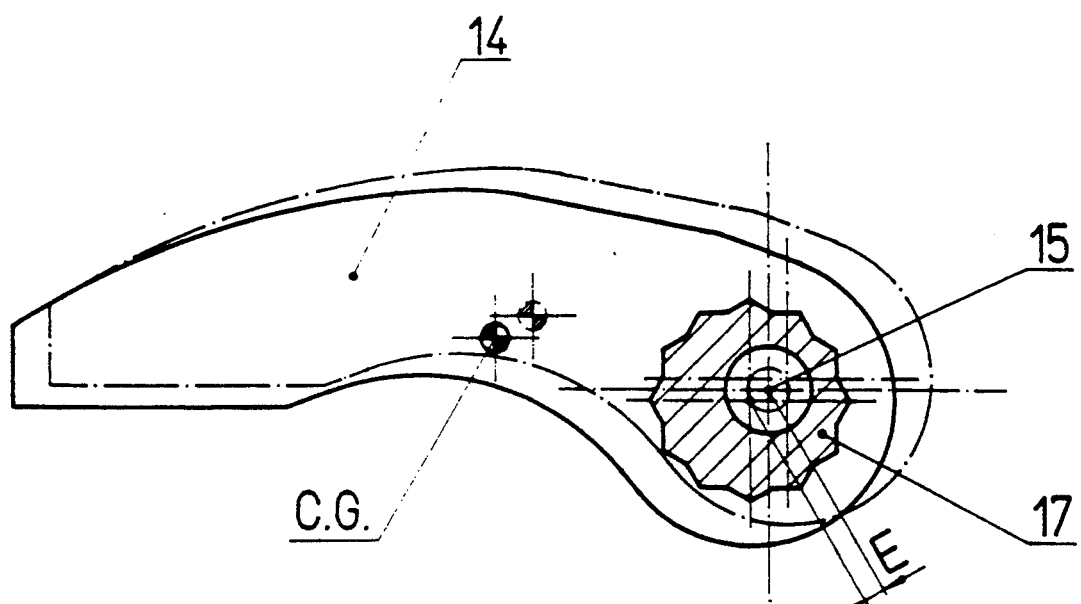
FIGS. 5A and 5B are enlarged schematic views showing one of the weighted levers and the adjustment means therefore.
Figure 5B:
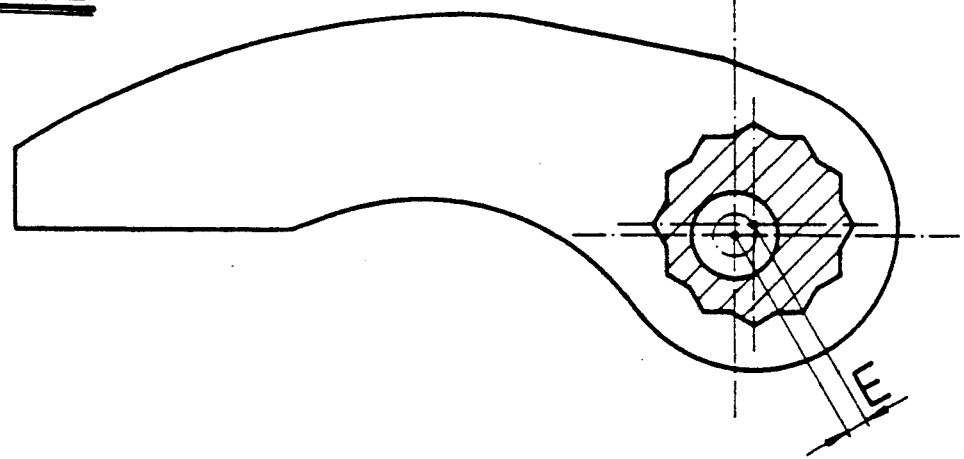

The interrelationship of the eccentric 17 and the adjusting lever 14, and the range of adjustment possible, is illustrated more clearly in FIGS. 5A and 5B. Depending upon the effect to be achieved, the arrangement may provide for any number of positions of adjustment between the eccentric 17 and the lever 14, e.g. from twelve to twenty. In the embodiment shown, the eccentric 17 is a regular polygon defining twelve crests, and accordingly has twelve positions of angular adjustment relative to the lever 14. The pin 15 is mounted at a fixed position and as shown in FIG. 5A is spaced from the geometric center of the eccentric 17 by a distance E. Thus rotation of the eccentric through its various positions of angular adjustment can more the lever 14 between the position shown in FIG. 5A and in FIG. 5B, the latter position being also illustrated in broken lines in FIG. 5A, moving the center of gravity CG of the lever through the distance illustrated in FIG. 5A. In terms of the effects achieved in the performance of the drive pulley, this range of adjustment is sufficient to produce large changes in the performance characteristics.

What we claim as our invention is:

1. An infinitely variable drive pulley for a belt drive transmission, said pulley comprising a shaft that carries opposed first and second frusto-conical flanges adapted to accommodate between them a drive belt, said first flange being axially fixed on the shaft, said second flange being arranged on the shaft so as to be moveable in the axial direction thereon against the force of at least one return spring, said pulley including centrifugal weights in the form of adjusting levers, each said lever being pivotally mounted on a pin that is carried at a fixed position relative to one of said flanges, each said lever defining a cam surface that is adapted to engage a follower that is fixedly related to the other said flange, each said lever being so disposed that upon rotation of said pulley a centrifugal force is generated to press said cam surface into engagement with said follower with a pressure that increases with the speed of rotation such engagement applying a force that urges second flange to move axially towards said first flange against the force of said return spring, wherein an adjustable eccentric member is interposed between each said lever end its associated pin, said eccentric member being angularly adjustable to effect variations in the position of said lever relative to said pin in a plane normal to the axis of said pin.

2. A drive pulley as claimed in claim 1, wherein said adjusting eccentric member is in the shape of a regular polygon and is received in a corresponding polygonal recess in the adjusting lever, said adjusting eccentric member defining an eccentric base in which is received said pivot pin.

3. A drive pulley as claimed in claim 1 or claim 2 wherein said adjusting member provides between 12 and 20 positions of adjustment.

* * * * *

UNITED STATES PATENT AND TRADEMARK OFFICE
CERTIFICATE OF CORRECTION

PATENT NO. : 5,326,330
DATED : July 5, 1994
INVENTOR(S) : Willy Bostelmann

It is certified that error appears in the above-indentified patent and that said Letters Patent is hereby corrected as shown below:

On the title page:

On the title page, item:[30], delete "Italy" and insert --Austria--.

Signed and Sealed this

Tenth Day of October, 1995

Attest:

Attesting Officer

BRUCE LEHMAN

Commissioner of Patents and Trademarks